United States Patent [19]

Wentworth

[11] Patent Number: 5,420,414
[45] Date of Patent: May 30, 1995

[54] NIGHT VISION GOGGLE SIMULATOR AND METHOD WITH REPLACEABLE FIBER OPTIC LENS ASSEMBLY

[75] Inventor: Edwin W. Wentworth, Dale City, Va.

[73] Assignee: The United States of America as represented by The Secretary of the Army, Washington, D.C.

[21] Appl. No.: 238,609

[22] Filed: May 5, 1994

[51] Int. Cl.⁶ .............................................. H01J 3/14
[52] U.S. Cl. .............................. 250/216; 250/214 VT
[58] Field of Search ................... 385/120, 116, 117; 250/214 VT, 216, 227.20, 227.11

[56] References Cited

U.S. PATENT DOCUMENTS 4,202,601  5/1980  Burbo et al. ........................ 350/159
4,822,994  4/1989  Johnson et al. .............. 250/213 VT Primary Examiner—David C. Nelms
Assistant Examiner—Jacqueline M. Steady
Attorney, Agent, or Firm—Milton W. Lee; Alain L. Bashore; Anthony T. Lane

[57] ABSTRACT

Night vision goggles that is internally modified such as to provide a realistic simulator without activation of any night vision enhancement and includes a depth perception loss. An assembly is positioned after the objective assembly on the same optical axis for the transfer of the focused incoming light, which light is also color filtered. A fiber optic rod achieves the transfer of the focused incoming light without any use of an image intensifier tube.

3 Claims, 3 Drawing Sheets

NIGHT VISION GOGGLE SIMULATOR AND METHOD WITH REPLACEABLE FIBER OPTIC LENS ASSEMBLY

BACKGROUND OF THE INVENTION

1. Field of the Invention

The present invention generally relates to night vision simulators and more specifically, to image intensifier ($I^2$) devices that are internally modifiable such as to provide a realistic simulator under daylight conditions with substantial loss of depth perception.

2. Description of Prior Art

Using night vision simulations such as showing a video film, is known in the prior art for training the soldier, but there is no realistic effect gained by such simulations. When night vision enhancement devices are used there is a loss of depth perception and a tunneling effect which occurs to the user's vision. A physical affect of using a night vision enhancement device is also present. Many night vision devices, such as goggles can also be worn which give the user the added training in a change of comfort. The proper wearing or use of the device is also crucial since detectable visible light could leak out from around the users eyes if the device is not properly positioned. These effects must somehow be replicated so that a realistic simulation can be effected.

One obvious solution to this dilemma is to provide night training with the actual night vision enhancement device, but this solution has always posed serious problems. Unfortunately, to train with the actual device itself has meant that the training could occur only at night, since the image intensifier tube can be damaged at normal light levels, and has led to associated wear and tear on the device. When used at night during a training exercise, the lack of depth perception, and tunneling effect lead to unfortunate results for the relatively untrained. Whenever the night vision device is utilized, the power source lifetime becomes a factor which severely limits their use. Typical batteries such as those used in the AN/PVS-7B night vision goggle has a normal operating lifetime of less than 12 hours of total operation. With replacement costs of all the batteries required and total average training time taken into account, an average of one half million dollars is spent on nighttime training utilizing the actual device itself.

While the prior art has reported using night vision simulators none have established a basis for a specific apparatus that is dedicated to the task of resolving the particular problem at hand. What is needed in this instance is a night vision goggle that when internally modified provides a realistic simulator under daylight conditions with substantial loss of depth perception.

SUMMARY OF THE INVENTION

It is therefore the primary object of the invention to provide a night vision goggle that when internally modified provides a realistic simulator under daylight conditions with substantial loss of depth perception.

According to the invention, there is disclosed night vision goggles as an image intensifier device that is internally modifiable such as to provide a realistic simulator without activation of any night vision enhancement and with substantial loss of depth perception. An objective lens assembly focuses incoming incident light on an optical axis. Assembly means positioned after the objective assembly on the same optical axis allows for the straight-through transfer of the focused incoming light which is also green filtered. A straight through fiber optic rod achieves the straight-through transfer of the focused incoming light without any use of an image intensifier tube. A collimator collimates and splits the green filtered light into two identically separate light beams on the optical axis after the assembly means. Each light beam is sent through separate eyepieces after the means for collimating and splitting for focusing onto the eye, such that a simulation of a night vision enhanced scene is achieved in daylight. By replacing the assembly means within the device with an image intensifier tube, a functional image intensifier device would result.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
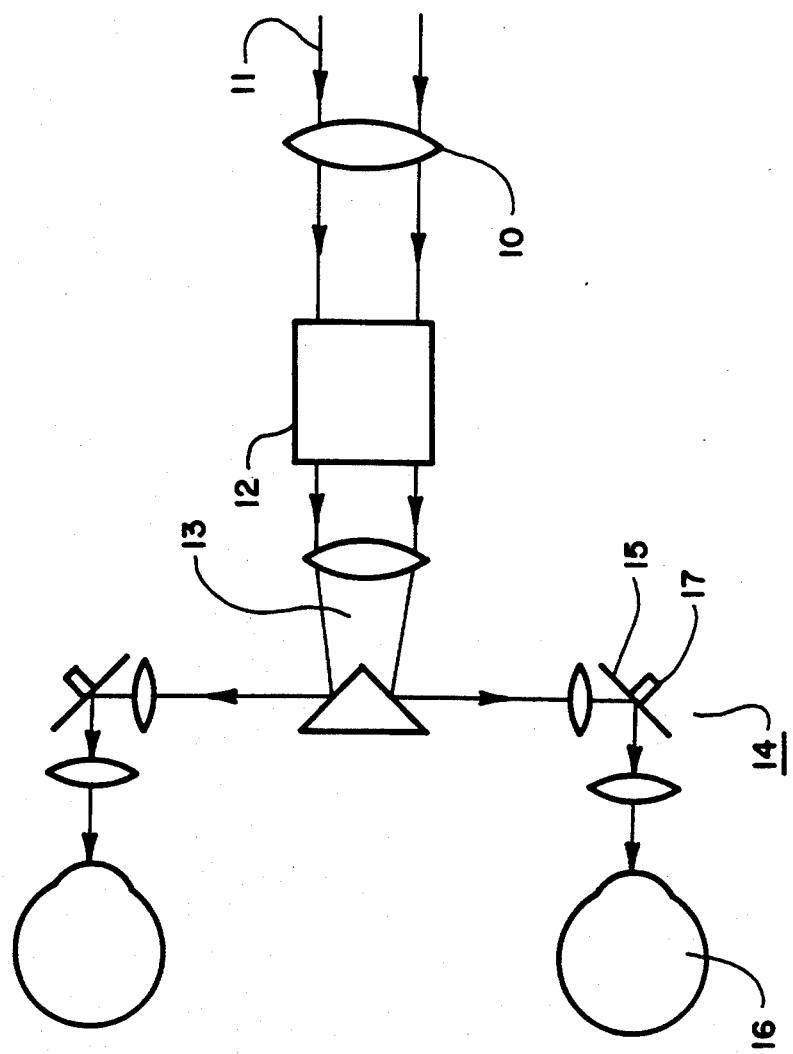
FIG. 1 is an optical ray trace diagram depicting the optical pathway utilizing the invention in a night vision goggle.

Referring now to the drawings, and more particularly to FIG. 1, there is shown an optical ray trace diagram depicting the optical pathway utilizing the invention in a night vision goggle. Objective lens element 10 receives available incoming light 11 as luminous energy. The energy is transmitted though tube 12 and forward through collimator 13 where it is split for binocular viewing through two eyepieces one of which is next described. Eyepiece 14, contains mirror 15 which allows the operators's eyes 16 to view both the projected night scene and LED indicators 17 used to indicates battery and IR illumination status. Tube 12 in the prior art includes within an image intensifier tube which would function to intensify the image projected therethrough. In the present invention tube 12 includes within a straight through fiber optic rod in place of the image intensifier tube components. A green filter with monochrome background is also included within tube 12 so as to give the viewer a simulated color background that would be seen with the image intensifier tube.

Figure 2:
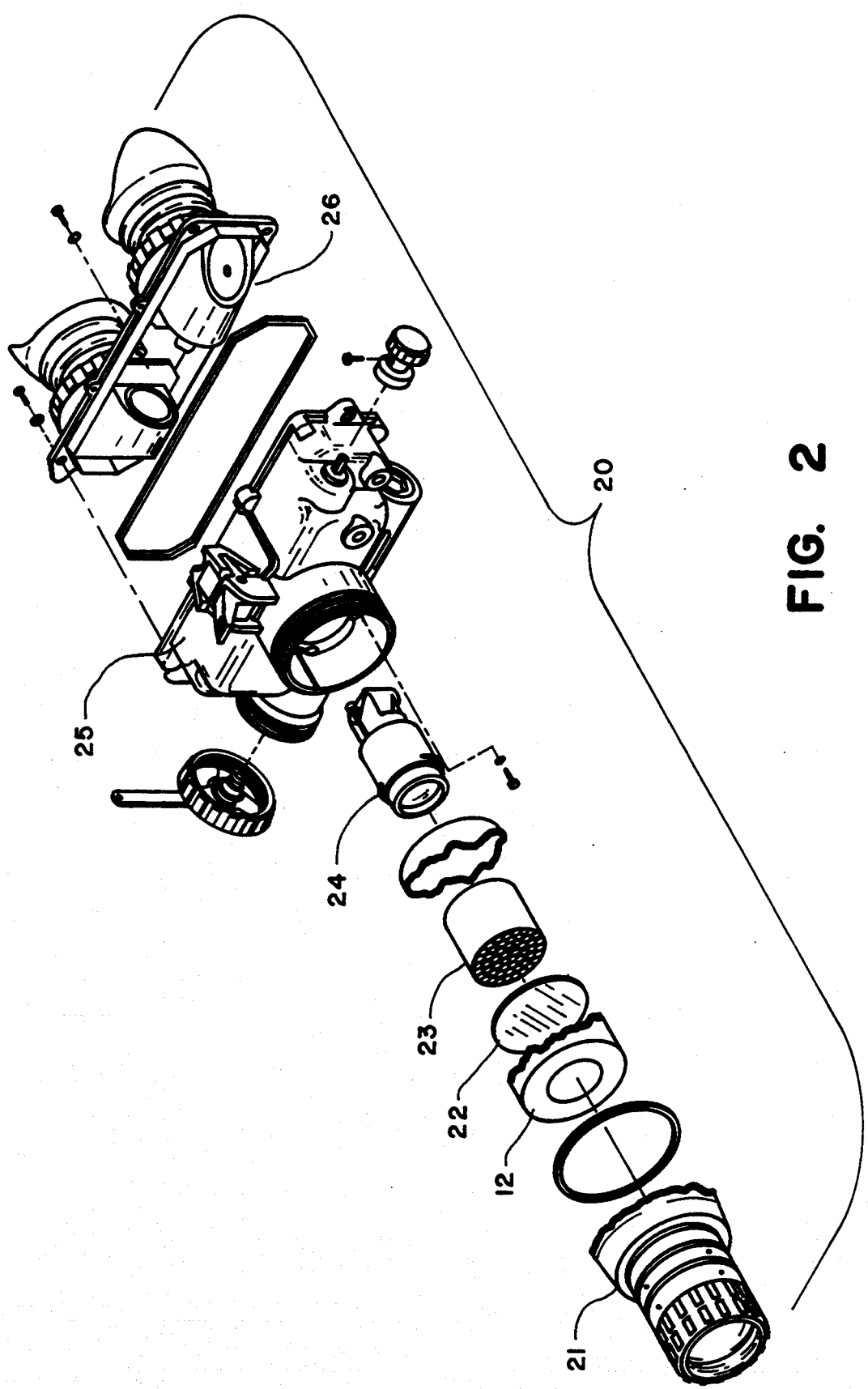
FIG. 2 is a pictorial breakdown of night vision goggles utilizing the present invention.

FIG. 2 is a pictorial breakdown of presently fielded night vision goggles AN/PVS-7B utilizing the present invention. Goggles 20 include objective lens mount assembly 21 allows for the adjustable focus of incoming light which passes into tube 12 and through green filter 22 to continue through straight-through fiber optic rod 23 both located within tube 12 of FIG. 1. Straight-through fiber optic rod 23 includes multiple bonded fiber optic strands which are processed in process steps including cut ends that are polished. The fiber optic rod utilized in the prior art image intensifier tube is twisted during processing so that an inverted image is achieved for the image intensifier tube. It is understood that green filter 22 may be placed anywhere within the optic path or that any means which provide the viewed scene in color, such as washing the fiber optic rod in a green dye so as to produce the same effect as a filter may be used.

Collimator 24 collimates the light that is output from tube assembly 12 and is split by an internal prism therethrough goggle body assembly 25 to both left and right eyepieces included within assembly 26. No power source is required present for the goggle to function as a simulator such that no electrical function of the prior art goggle would operate (including the LED indicators 17 of FIG. 1).

Figure 3:
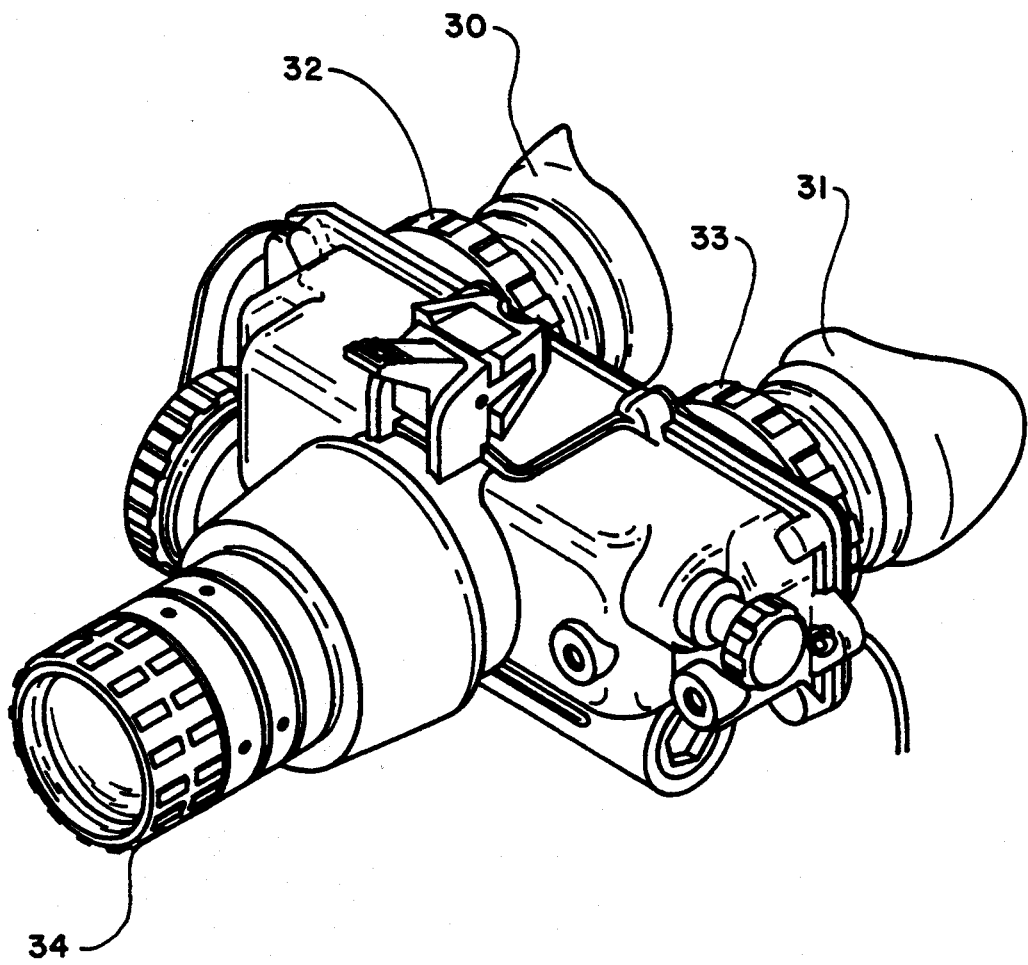
FIG. 3 is a perspective view of the night vision goggles utilizing the present invention.

FIG. 3 is a perspective view of the night vision goggles utilizing the present invention to function as a simulator. Access to the body of the goggle shown is provided by unscrewing the objective lens assembly. The image intensifier tube would be removed and the fiber optic assembly put in its place. The access to the body of the goggle would then be closed. The operator would position both eyes about eyecups 30 and 31 upon which the operator would view the simulated night vision enhanced scene. The interpupillary distance may be adjusted by moving the eyepiece assemblies laterally. Diopter focus rings 32 and 33 are adjustable by rotating so that the eyepiece assemblies are focused. By adjusting focus ring 34 the objective lens is also focused for the user. The simulated scene would be in green and would resemble a night vision enhanced scene including a "tunnel vision" effect, with substantial loss of depth perception. When desired to use the goggle as a real night vision enhancement device again, the tube assembly 12 of FIG. 2 could be simply removed and replaced with an image intensifier tube. What is thus achieved is the body of the image intensifier device as the simulator by internally modifying such, so as to provide a realistic simulator without activation of the night vision enhancement and with loss of depth perception.

The present invention can be utilized in any night vision enhancement device that utilizes an image intensifier tube. Examples of other previously fielded night vision enhancement device models that can be utilized include but is not limited to: AN/AVS-6, AN/VVS-2, and the AN/TVS-5. The number of objective lens assemblies and eyepieces are not restricting to the application of this invention.

While this invention has been described in terms of preferred embodiment consisting of a goggle as the simulator, those skilled in the art will recognize that the invention can be practiced with modification within the spirit and scope of the appended claims.

Having thus described my invention, what I claim as new and desire to secure by Letters Patent is as follows:

1. A modified night vision image intensifier device for providing realistic simulation of night vision viewing conditions during daylight use, to include depth perception loss, wherein the device includes an assembly lens means positioned after an objective assembly on the same optical axis, for the transfer of focused incoming light which is modified, after which the modified light is collimated then accepted into one or more eyepieces for focusing onto the eye, the improvement including:

a fiber optic rod within the assembly lens means for providing a transfer of the focused incoming light; and means for providing a color filtered scene placed on the optical axis such that a simulation of a night vision enhanced scene is achieved during daylight operational conditions wherein the image intensifier device may be returned to its intended image intensifier function by replacing the assembly lens means and means for providing a colored filtered scene within the device with an image intensifier tube.

2. A modified night vision image intensifier device for providing realistic simulation of night vision viewing conditions during daylight use, to include depth perception loss, the device including:

an objective lens assembly for the focusing of incoming incident light along an optical axis;

a fiber optic assembly located after the objective lens assembly on the same optical axis, the fiber optic assembly means further including a fiber optic rod within the assembly means for providing a transfer of the focused incoming light;

means for providing a color filtered scene on the optical axis for simulating night vision viewing conditions;

means for collimating the filtered light on the optical axis, after the assembly means;

at least one eyepiece for accepting the filtered collimated light, such that a simulation of a night vision enhanced scene is achieved during daylight operational conditions wherein the image intensifier device may be returned to its intended image intensifier function by replacing the fiber optic assembly and means for providing a color filtered scene within the device with an image intensifier tube.

3. A method of modifying a night vision image intensifier device for providing realistic simulation of night vision viewing conditions during daylight use, to include depth perception loss including the steps of:

providing an interchangeable fiber optic assembly and means for providing a color filtered scene in lieu of an image intensifier tube;

providing access to the body of the night vision image intensifier device;

removing the image intensifier tube from within the body of the night vision image intensifier device;

replacing each image intensifier tube with a fiber optic assembly that provides a transfer of focused incoming light and a means for providing a color filtered scene;

closing the access provided to the body of the night vision device, such that a simulation of a night vision enhanced scene is achieved during daylight operational conditions wherein the image intensifier device may be returned to its intended image intensifier function by replacing the fiber optic assembly within the device with an image intensifier tube.

* * * * *